Dec. 20, 1955   J. W. NICKLE   2,727,526
SAFETY CAP FOR SHEAR RELIEF VALVES
Filed July 7, 1953   2 Sheets-Sheet 1

INVENTOR,
Johnson W. Nickle
Bailey, Stephens & Huettig
Attorneys

Dec. 20, 1955  J. W. NICKLE  2,727,526
SAFETY CAP FOR SHEAR RELIEF VALVES
Filed July 7, 1953  2 Sheets-Sheet 2

INVENTOR:
Johnson W. Nickle
Bailey, Stephens + Huettig
Attorneys

United States Patent Office 2,727,526
Patented Dec. 20, 1955

2,727,526
SAFETY CAP FOR SHEAR RELIEF VALVES

Johnson W. Nickle, Edmonton, Alberta, Canada

Application July 7, 1953, Serial No. 366,535

5 Claims. (Cl. 137—382)

This relates to a new and improved safety cap for shear relief valves.

In oil well drilling the pumps employed to circulate mud down through the drill pipes were often damaged when a blockage occurred in drill pipes causing a build-up of pressure. To overcome this difficulty a relief line is usually connected to the mud line at the well-head and a shear relief valve inserted therein.

Should a blockage occur in a drill pipe having a relief line attached thereto, the pressure built up will shear the relief valve pin which will release the valve and allow the mud to flow through the relief line before any damage is done to the mud pump.

The pressure at which such pins shear is very great and, in the past, many accidents resulted from personnel being struck by pieces of the broken pin and, sometimes, of the stem of the valve itself.

Previous safety devices have usually been in the form of a cylinder tightly screwed onto the valve casing over the valve stem. This type of cap, while it is effective as a safety device, is very inconvenient since it requires tools to remove it and since it does not provide for easy inspection or replacement of shear pins.

It is, therefore, an object of the present invention to provide a shear relief valve safety cap which adequately protects those working around a shear relief valve yet which allows direct inspection of the shear pin used while the safety cap is in the operating position.

It is another object of the present invention to provide a shear relief valve safety cap which permits easy access to the shear pin of the valve to which it is attached, such an operation requiring no tools whatsoever.

According to the present invention, a safety cap for shear relief valves comprises a lower portion, and an upper portion hinged thereto, said lower portion being rigidly securable to a valve casing and means for releasably locking said upper portion in abutment with said lower portion.

In the preferred form of the present device a longitudinal slot is formed in the side of the upper portion opposite the side at which it is hinged in order to allow valve stem-clearance, and inspection apertures are formed one on either side of the lower part of said upper portion intermediate said slot and the side of hinging.

Figure 1:
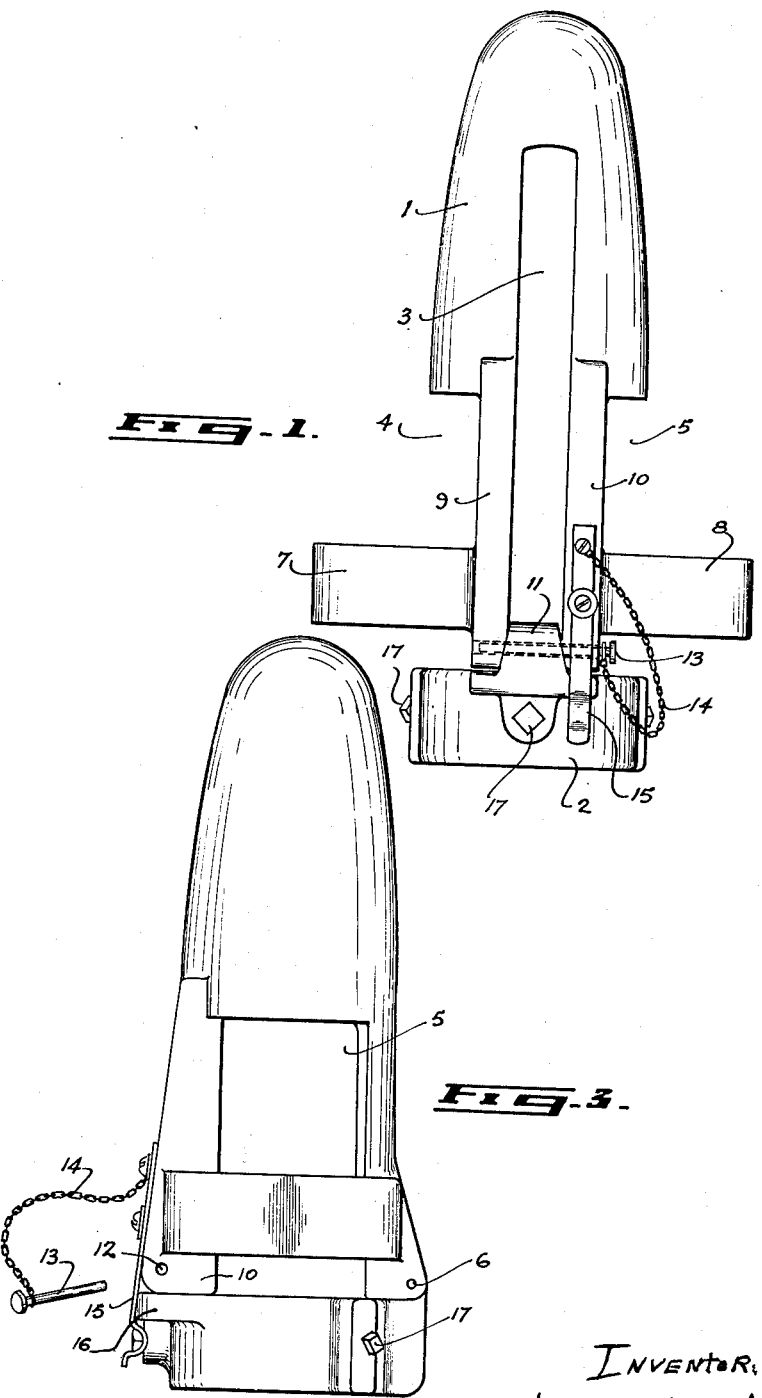
Figure 2:
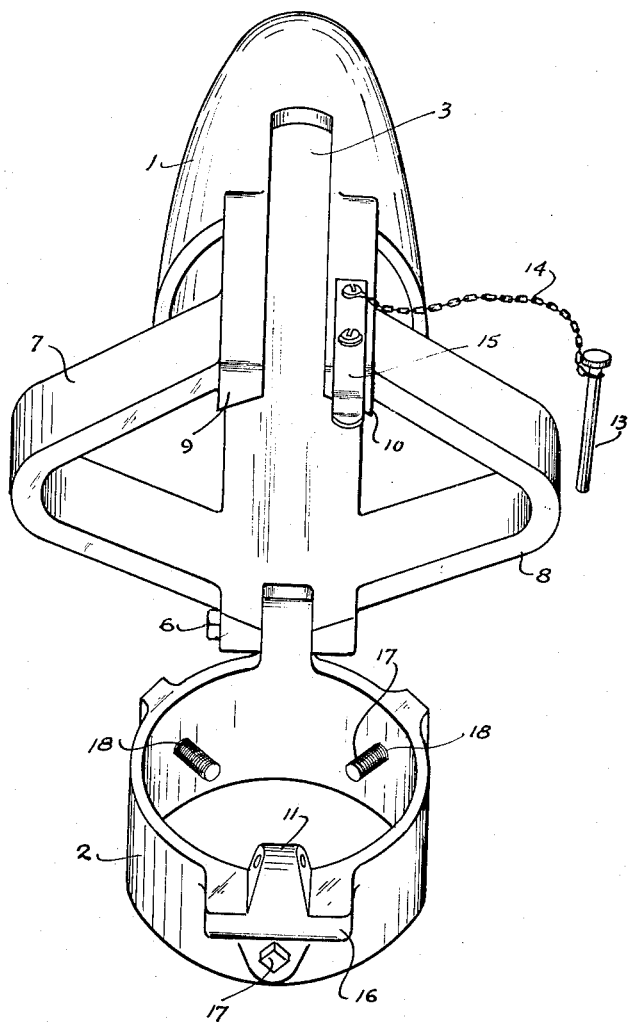

In the accompanying drawings which illustrate the preferred embodiments of the present invention:

Figure 1 shows a front elevation of a shear relief valve safety cap in the operating position, Figure 2 shows a front elevation of a shear relief valve safety cap in the open position, and Figure 3 shows a side elevation of a shear relief valve safety cap.

Referring to Figure 1, a shear relief valve safety cap has a comparatively large upper portion 1 which is hinged to a comparatively small, collar-like lower portion 2. A longitudinal slot 3 is formed in the side of the upper portion 1 opposite the side at which it is hinged to allow for valve stem-clearance.

On either side of the lower part of the upper portion inspection apertures 4 and 5 are formed intermediate the slot 3 and the side of hinging. The hinge 6 will be seen in Figure 3.

The sides 7 and 8 of the upper portion 1 below the apertures 4 and 5 bulge outwardly to provide a space for the shear pin of the valve to which the safety cap is attached.

Projections 9 and 10, one on either side of the slot 3, extend downwardly from the upper portion 1 and co-operate with a projection 11 formed on the lower portion 2 and aligned with the slot 3 to provide locking means to lock the upper and lower portions 1 and 2 in abutment one with the other. Referring to Figure 3, a hole 12 will be seen in the projection 10. Similar holes are formed in the projections 9 and 11, all of which are in alignment when the upper portion 1 is in abutment with the lower portion 2.

A locking pin 13 is attached to the upper portion 1 by means of a chain 14, and may be inserted through the hole 12 into the holes formed in projections 9 and 11 thus locking the upper portion 1 in abutment with the lower portion 2.

A spring-releasable clip 15 is also provided on the upper portion 1 and engages, when the upper and lower portions 1 and 2 are in abutment, a lip 16 formed on said lower portion.

Inwardly extending screws or bolts 17 are provided in internally threaded holes 18 spaced around the lower portion 2.

In operation, the lower portion 2 is fitted over the valve casing, just below the point at which the shear pin is inserted, and rigidly secured thereto by means of the bolts 17. The upper portion 1 is swung back on the hinge 6 and the desired shear pin is inserted. The upper portion 1 is now brought into abutment with the lower portion and locked into position by means of the locking pin 13.

At all times the shear pin may be inspected through the inspection apertures 4 and 5.

In spite of the inspection apertures 4 and 5, the present device affords quite adequate protection since the parts of the shear pin, when it is broken, will fly off at right angles to the stem of the valve and will be stopped by the sides 7 and 8. Should the stem of the valve itself break under the pressure, it will be effectively stopped by the enclosed upper part of the upper portion 1.

I claim:

1. A safety cap for shear relief valves comprising a lower portion, and an upper portion, said lower portion being rigidly securable to a valve casing, said upper portion being hinged to said lower portion and having a longitudinal valve stem-clearance slot formed therein opposite the side at which it is hinged, the lower part of said upper portion having inspection apertures formed in opposite sides thereof intermediate the hinged side and said slot, and means for releasably locking said upper portion in abutment with said lower portion.

2. A safety cap as claimed in claim 1 in which the sides of said upper portion between said inspection apertures and said lower portion bulge outwardly to form a valve shear pin receiving space.

3. A safety cap as claimed in claim 2 in which said lower portion is substantially annular and is secured to a valve casing by means of bolts extending inwardly through internally threaded holes formed in and spaced around said lower portion.

4. A safety cap as claimed in claim 2 in which said upper portion is releasably locked in abutment with said lower portion by means of projections extending downwardly from said upper portion, one on either side of said slot, and a projection formed on said lower portion and extending upwardly into said slot when both said portions are held in abutment, a hole being formed in each of said projections, said holes being in alignment one with another when said portions are in abutment, and a metal pin passing through said holes, a spring-releasable clip being rigidly secured to one of the projections formed on said upper portion and engageable with a lip formed on said lower portion.

5. A safety cap for shear relief valves comprising a lower portion, and an upper portion, said lower portion being relatively small and being rigidly securable to a valve casing by means of bolts extending inwardly through internally threaded holes formed in and spaced around said lower portion, said upper portion being hinged to said lower portion and having a longitudinal valve stem-clearance slot formed therein opposite the hinged side, the lower part of the upper portion having inspection apertures formed therein, one on either side thereof and intermediate said hinged side and said slot, the sides of said upper portion between said apertures and said lower portion bulge outwardly to form a valve shear pin receiving space, said upper portion being releasably locked in abutment with said lower portion by means of projections extending downwardly from said upper portion, one on either side of said slot, and a projection formed on said lower portion and extending upwardly into said slot when both said portions are held in abutment, a hole being formed in each of said projections, said holes being in alignment one with another when said portions are in abutment, and a metal pin passing through said holes, a spring-releasable clip being rigidly secured to one of the projections formed on said upper portion and engageable with a lip formed on said lower portion.

References Cited in the file of this patent

UNITED STATES PATENTS

| 1,278,813 | Weaver | Sept. 10, 1918 |
| 1,464,745 | Campbell | Aug. 14, 1923 |

FOREIGN PATENTS

| 403,775 | Great Britain | Jan. 4, 1934 |